_US009542130B2_

United States Patent
Subbaian et al.

(10) Patent No.: US 9,542,130 B2
(45) Date of Patent: Jan. 10, 2017

(54) MASK BASED TONER REDUCTION

(71) Applicant: Xerox Corporation, Norwalk, CT (US)

(72) Inventors: Sudhagar Subbaian, Tamilnadu (IN); Deepthi Sidavanahalli Rao, Lake Oswego, OR (US)

(73) Assignee: Xerox Corporation, Norwalk, CT (US)

( * ) Notice: Subject to any disclaimer, the term of this patent is extended or adjusted under 35 U.S.C. 154(b) by 40 days.

(21) Appl. No.: 14/677,128

(22) Filed: Apr. 2, 2015

(65) Prior Publication Data

US 2016/0291905 A1  Oct. 6, 2016

(51) Int. Cl.
*G06F 15/00* (2006.01)
*G06K 1/00* (2006.01)
*G06F 3/12* (2006.01)
*G06K 15/02* (2006.01)

(52) U.S. Cl.
CPC .......... *G06F 3/1219* (2013.01); *G06F 3/1239* (2013.01); *G06K 15/1867* (2013.01)

(58) Field of Classification Search
None
See application file for complete search history.

(56) References Cited

U.S. PATENT DOCUMENTS

| | | | |
|---|---|---|---|
| 5,111,310 A | 5/1992 | Parker et al. | |
| 5,553,200 A * | 9/1996 | Accad | H04N 1/648 358/1.15 |
| 5,625,755 A * | 4/1997 | Shu | H04N 1/4051 358/1.9 |
| 5,646,670 A | 7/1997 | Seto et al. | |
| 5,751,433 A | 5/1998 | Narendranath et al. | |
| 5,751,434 A | 5/1998 | Narendranath et al. | |
| 5,946,450 A | 8/1999 | Ebner et al. | |
| 5,999,273 A | 12/1999 | Casey et al. | |
| 6,046,821 A | 4/2000 | Curry | |
| 6,313,925 B1 | 11/2001 | Decker et al. | |
| 6,975,427 B1 | 12/2005 | Lucky et al. | |
| 6,975,428 B1 | 12/2005 | Ernst et al. | |
| 7,064,859 B1 | 6/2006 | Dittrich et al. | |
| 7,272,261 B2 | 9/2007 | Wang et al. | |
| 7,424,151 B2 | 9/2008 | Lin et al. | |
| 7,518,754 B2 * | 4/2009 | Cooper | H04N 1/4053 358/3.03 |
| 7,679,787 B2 * | 3/2010 | Wang | H04N 1/52 358/1.9 |

(Continued)

FOREIGN PATENT DOCUMENTS

| | | |
|---|---|---|
| EP | 0592108 B1 | 2/2003 |
| EP | 2429167 A2 | 3/2012 |
| WO | 82/00652 A1 | 3/1982 |

*Primary Examiner* — Vincent Rudolph
*Assistant Examiner* — Michael Burleson
(74) *Attorney, Agent, or Firm* — Gibb & Riley, LLC

(57) ABSTRACT

Systems and methods for reducing toner usage. A print job is received into a print engine. The print engine comprises a processor, and the print job comprises an image. A halftone screen is applied to the pixels of continuous image data for the image. The processor produces a threshold array of pixel values based on the halftone screen. The processor generates a mask based on the halftone screen for each color plane of the image. The processor applies the mask to the threshold array, creating a modified threshold array. The modified threshold array corresponds to relatively reduced toner usage for rendering the image.

19 Claims, 10 Drawing Sheets

(56) References Cited

U.S. PATENT DOCUMENTS

| | | | |
|---|---|---|---|
| 7,898,692 B2* | 3/2011 | Wang | H04N 1/4058 |
| | | | 358/1.9 |
| 8,068,256 B2* | 11/2011 | Dalal | H04N 1/4055 |
| | | | 358/1.9 |
| 8,170,429 B2 | 5/2012 | Nishikawa | |
| 8,797,601 B2* | 8/2014 | Yao | H04N 1/409 |
| | | | 358/1.9 |
| 2008/0170246 A1 | 7/2008 | Patton et al. | |
| 2011/0019213 A1 | 1/2011 | Safonov et al. | |

* cited by examiner

MASK BASED TONER REDUCTION

BACKGROUND

Systems and methods herein generally relate to machines having print engines such as printers and/or copier devices and, more particularly, to color management in image/text printing.

Conventional digital reprographic systems receive electronic image(s), which are passed to an image-processing unit. The image-processing unit may be a combination of software and hardware elements that accepts the electronic images from different sources and performs operations needed to convert the images to the format compatible with the output path of the digital reprographic system.

For example, a conventional image-processing unit may convert continuous tone image data into binary image data. The conventional image-processing unit may convert the binary image data into a reduced coverage (economy mode or draft mode) bitmap of binary image data. Conventional digital reprographic systems convert image data into a reduced coverage (economy mode or draft mode) bitmap of binary image data to save toner or ink usage. The economy mode may have the same resolution as a regular print mode in a conventional digital reprographic system, but a color table or a transfer function reduces toner or ink usage.

In general, maximizing the toner yield on an electrophotographic printer is achieved by reducing the usage of toner in printers, especially in color printers. When printing in an economy mode, a data stream representing the image may be processed so that the printer uses less marking material (ink or toner) to print the image than it would if the processing was not performed. Several methods are currently in use but there are trade-offs with respect to image quality.

The current toner savings methods can be broadly classified into the following categories:

1. Reducing halftone frequency—By default, using low frequency halftone will result in higher toner yields/cartridge or bottle. It is easier to implement and no additional processing time is required. It will directly lead to high toner savings at the cost of image quality.
2. Adjusting tone reproduction curve (TRC)—This method is very simple and easy to implement. The toner consumption can be reduced with a simple adjustment to the TRC. TRC may be applied on the halftone threshold array and the resultant threshold array can be applied on the input image to render it. Adjusting the TRC is very simple to implement and the processing time is about the same as the time for applying TRC on halftone. This TRC method will provide high toner saving with a trade-off on quality.
3. Using neighborhood processing—In this method, a rendered image (halftoned plane) is used to decide which pixel needs to be turned on/off. This method will provide moderate toner saver with acceptable image quality; however, it is more complex to implement. This method requires additional processing time for a transfer function that determines which pixels are needed to be marked on paper (e.g., removing center pixel from a 3×3 array).
4. Optimizing print engine and IOT components for better toner yields.

All of the above mentioned methods have significant impact on the image quality. Some of these methods achieve savings by trading the quality of output. In one of the methods (Controlling Colors by TRC) the colors may be washed away, other methods create artifacts in the image; and some methods are suitable only for Black and White.

Additionally, for color printers, each color toner is used at a different rate. Generally, when a printer is low on one toner, the printer device warns the user to replace that particular toner. When the toner level reaches a critical point, the user is unable to print any document until the empty toner is replaced.

SUMMARY

In one aspect of a method disclosed herein, the halftone frequency is selected based on the capability of engine such that any banding or any other kinds of artifacts are minimized to the extent possible. The halftone frequency is carefully selected for all color planes such that any moiré is avoided. With the selected frequency for each plane, a threshold array is generated and applied to the input plane to produce a halftoned/rendered image.

According to a method herein, a print job is received into a print engine. The print engine comprises a processor, and the print job comprises an image. A threshold array of pixel values is produced by the processor for each color plane of the image based on a halftone screen. The halftone screen includes separate halftone frequencies and different threshold values for each color plane of the image. The halftone frequencies and the threshold values are established during calibration of the print engine. A mask is generated for each the color plane of the image based on the halftone screen. Generating the mask comprises grouping the pixel values for the threshold array into a selected number of clusters, arranging the clusters into a cluster array using one pixel value from each cluster, and identifying pixel values to remove from the threshold array based on the location of the pixel value in the cluster array. The mask is controlled to avoid removing two consecutive pixels from the image based on the threshold array. The processor applies the mask to the threshold array, creating a modified threshold array. The modified threshold array corresponds to relatively reduced toner usage for rendering the image.

According to another method herein, digitized pixels for an image comprising color planes of different colors are received. The digitized pixels comprise continuous image data. A halftone screen is applied to the pixels of the continuous image data. The halftone screen includes separate halftone frequencies and different threshold values for each color plane of the image. The halftone frequencies and the threshold values are set during calibration of the print engine. The halftone frequencies are based on reducing banding and image artifacts in a rendered image. A threshold array of pixel values is produced by applying the halftone screen. A mask is generated based on the halftone screen for each of the color planes of the image. The mask is generated by grouping the pixel values from the threshold array into a selected number of clusters, arranging the clusters into a cluster array using one pixel value from each cluster, and identifying pixel values to remove from the threshold array based on location of the pixel value in the cluster array. The mask is controlled to avoid removing two consecutive pixels from the image based on the threshold array. The threshold array of pixel values is translated to an image file. The mask is applied to the image file, removing selected pixels from the rendered image, based on the mask.

According to a multifunction device, a control system comprises a processor. The processor comprises a digital image processor. A user interface is connected to the control system. An image output device is connected to the processor. The user interface provides user selection of a level of toner savings for the image output device. The processor receives digitized pixels for an image comprising color planes of different colors. The digitized pixels comprise continuous image data. The digital image processor applies a halftone screen to the digitized pixels of the continuous image data. The halftone screen includes separate halftone frequencies and different threshold values for each color plane of the image. The halftone frequencies and the threshold values are set during calibration of a print engine associated with the image output device. The halftone frequencies are based on reducing banding and image artifacts in a rendered image according to the image output device. The digital image processor produces a threshold array of pixel values using the halftone screen. The processor generates a mask based on the halftone screen for each of the color planes of the image. The mask is generated by grouping the pixel values from the threshold array into a selected number of clusters, arranging the clusters into a cluster array using one pixel value from each cluster, and identifying pixel values to remove from the threshold array based on the location of the pixel value in the cluster array. The mask is controlled to avoid removing two consecutive pixels from the image based on the threshold array. The processor translates the threshold array of pixel values to an image file. The processor applies the mask to the image file, removing selected pixels from the rendered image. The processor sends the image file to the image output device.

According to a method herein, digitized pixels for an image comprising color planes of different colors are received into a print engine. The print engine comprises a processor. The digitized pixels comprise continuous image data. A halftone screen is applied to the pixels of continuous image data. The halftone screen includes separate halftone frequencies and different threshold values for each color plane of the image. The halftone frequencies and the threshold values are set during calibration of the print engine. A threshold array of pixel values is produced based on the halftone screen. A mask is generated based on the halftone screen for each of the color planes of the image. The generating of the mask comprises: grouping the pixel values for the threshold array into a selected number of clusters, arranging the clusters into a cluster array using one pixel value from each cluster, and identifying pixel values to remove from the threshold array based on the location of the pixel value in the cluster array. The mask is controlled to avoid removing two consecutive pixels from the image based on the threshold array. The mask is applied to the threshold array, creating a modified threshold array. The modified threshold array corresponds to relatively reduced toner usage for rendering the image.

According to a non-transitory computer readable storage medium herein, the non-transitory computer readable storage medium stores instructions executable by a computerized device to perform a method. According to the method, digitized pixels for an image comprising color planes of different colors are received. The digitized pixels comprise continuous image data. A halftone screen is applied to the pixels of the continuous image data. The halftone screen has a frequency based on reducing banding and image artifacts in a rendered image. A threshold array of pixel values is produced using the halftone screen. A mask is generated based on the halftone screen for each of the color planes of the image. The threshold array of pixel values is translated to an image file. The mask is applied to the image file, removing selected pixels from the rendered image.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
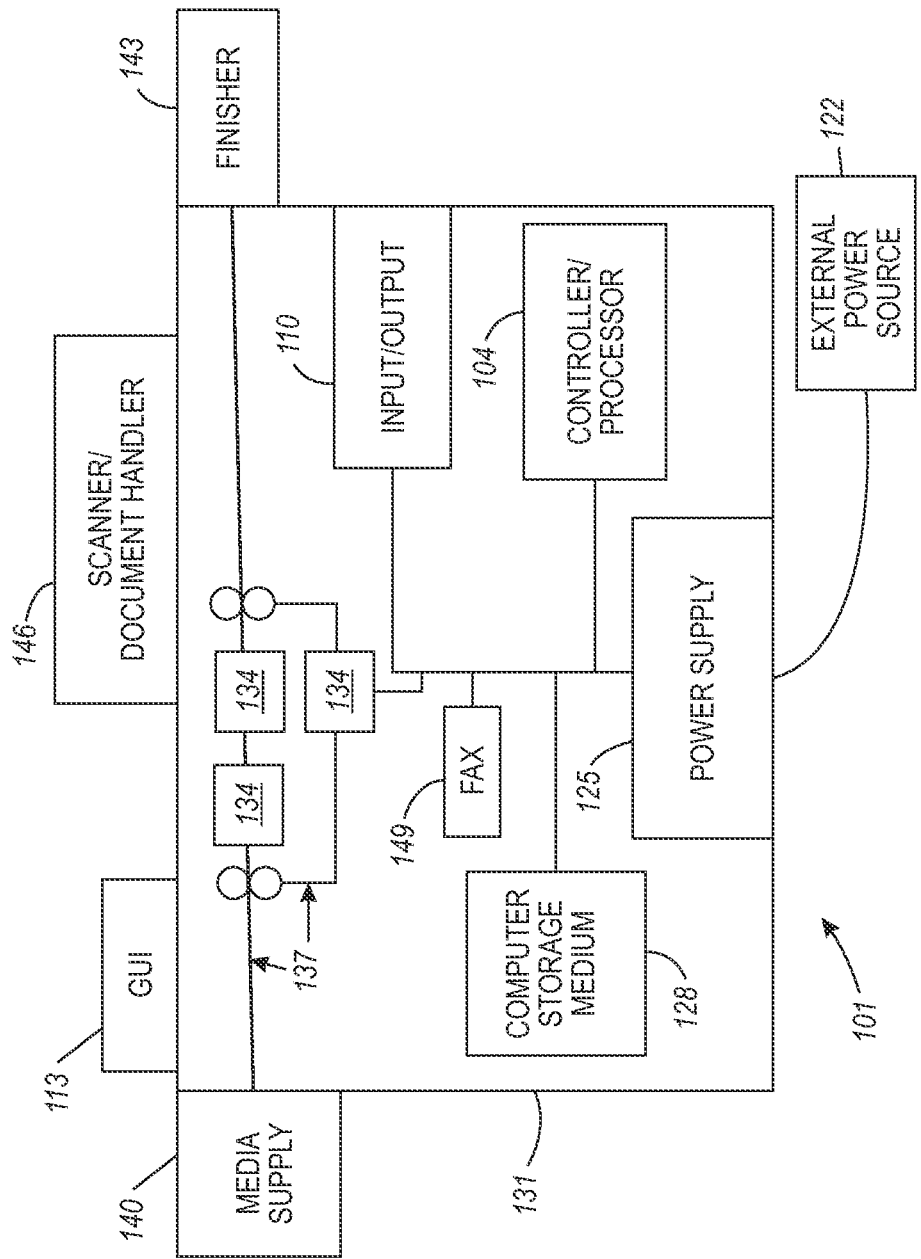
FIG. 1 is a side-view schematic diagram of a multi-function device according to systems and methods herein.

The disclosure will now be described by reference to a multi-function device that includes a print engine having a digital image processor. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

Figure 9:
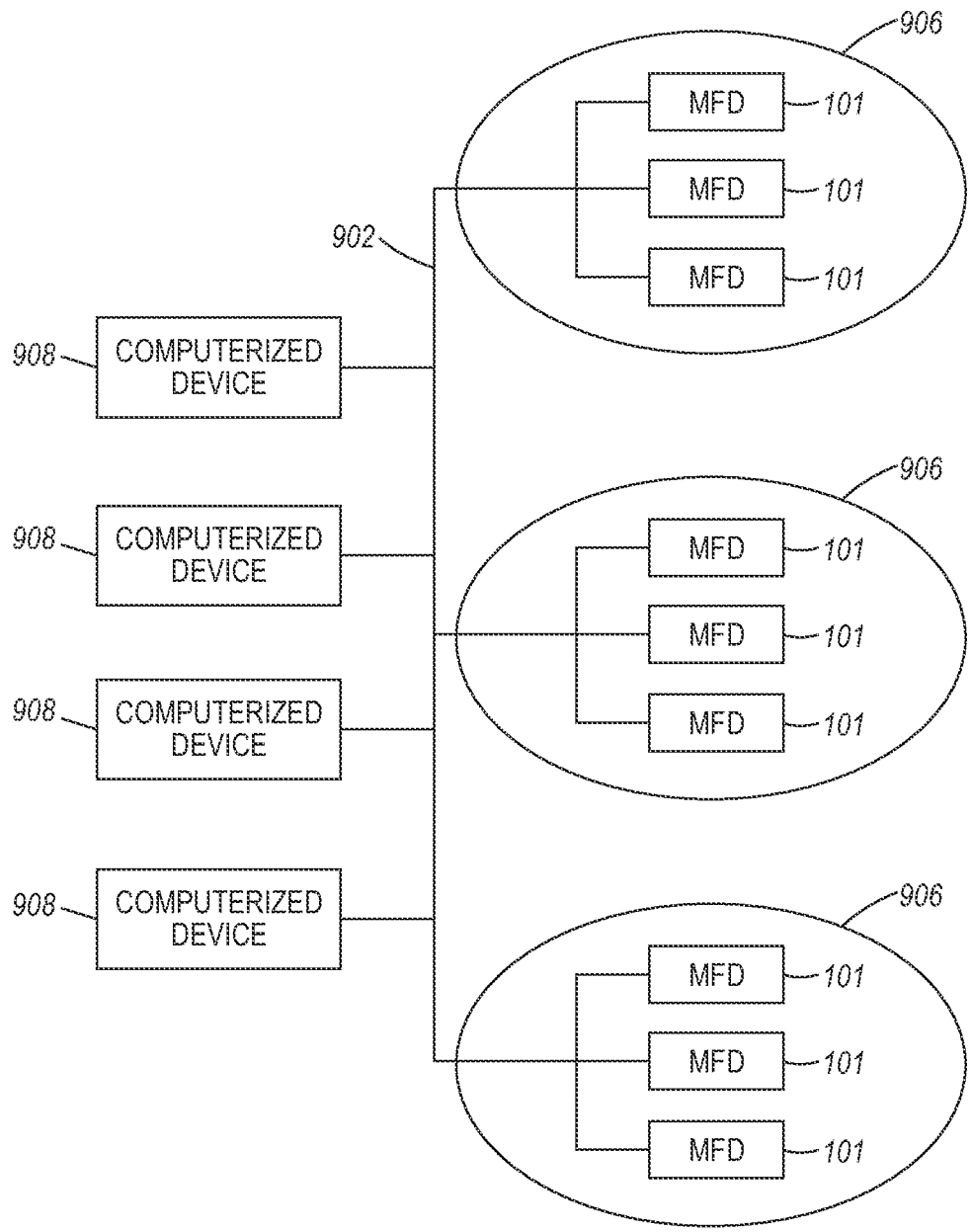
FIG. 9 is a schematic diagram illustrating systems and methods herein.

FIG. 1 illustrates a multi-function device 101 that can be used with systems and methods herein and can comprise, for example, a printer, copier, fax machine, etc. The multi-function device 101 includes a controller/processor 104 and an input/output device 110 operatively connected to the controller/processor 104. As described above, the controller/processor 104 may be connected and to a computerized network 902 external to the multi-function device 101 through a communications port of the input/output device 110, such as shown in FIG. 9, described below. In addition, the multi-function device 101 can include at least one accessory functional component, such as a graphic user interface assembly (GUI) 113. The GUI 113 operates on power supplied from an external power source 122. The external power source 122 may provide electrical power through the power supply 125.

The input/output device 110 is used for communications to and from the multi-function device 101. The controller/processor 104 controls the various actions of the multi-function device 101. A non-transitory computer storage medium 128 (which can be optical, magnetic, capacitor based, etc.) is readable by the controller/processor 104 and stores instructions that the controller/processor 104 executes to allow the multi-function device 101 to perform its various functions, such as those described herein.

According to systems and methods herein, the controller/processor 104 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 101 is special purpose machine that includes a specialized image processing card having unique ASICs for providing image processing instructions, includes specialized boards having unique ASICs for input and output devices to speed network communications processing, a specialized ASIC processor that performs the logic of the methods described herein using dedicated unique hardware logic circuits, etc. It is contemplated that the controller/processor 104 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 1, a device housing 131 has one or more functional components that operate on power supplied from the external power source 122, which may comprise an alternating current (AC) power source, through the power supply 125. The power supply 125 can comprise a power storage element (e.g., a battery) and connects to the external power source 122. The power supply 125 converts the external power into the type of power needed by the various components of the multi-function device 101.

The multi-function device 101 may include at least one marking device 134 (sometimes referred to as printing engines) operatively connected to the controller/processor 104, a media path 137 positioned to supply sheets of media from a media supply 140 to the marking device(s) 134, etc., along the media path 137. After receiving various markings from the printing engine(s), the sheets of media can optionally pass to a finisher 143 which can fold, staple, sort, etc., the various printed sheets. In addition, the multi-function device 101 can include at least one accessory functional component (such as a scanner/document handler 146, fax module 149, etc.) that also operates on the power supplied from the external power source 122 (through the power supply 125). The fax module 149 may operate in conjunction with the scanner/document handler 146.

The scanner/document handler 146 may be any image input device capable of obtaining information from an image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the art, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

As would be understood by those ordinarily skilled in the art, the multi-function device 101 shown in FIG. 1 is only one example and the systems and methods herein are equally applicable to other types of printing devices that may include fewer components or more components. For example, while a limited number of printing engines and paper paths are illustrated in FIG. 1, those ordinarily skilled in the art would understand that many more paper paths and additional printing engines could be included within any printing device used with systems and methods herein.

Figure 2:
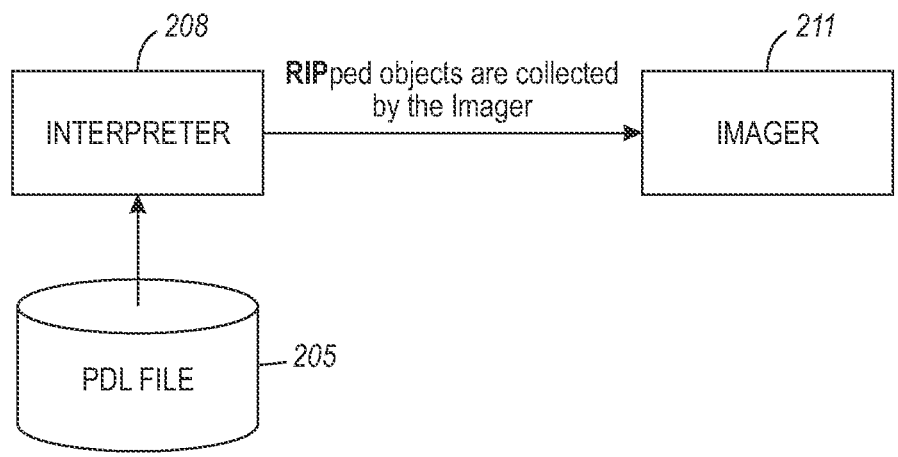
FIG. 2 is a flow diagram illustrating a broad overview of a process according to systems and methods herein.

As shown FIG. 2, an incoming job may include a PDL file 205 that describes the appearance of a printed page according to the job. The input may be a page description using a page description language (PDL). A page description language (PDL) is a computer language that describes for the print engine the appearance of a printed page in a higher level than an actual output bitmap. The PDL file 205 specifies the arrangement of the printed page through commands for the print engine. An interpreter 208 may be used in a preprocessing step to interpret a specified number of job pages.

An exemplary processing system may include an interpreter 208 and an imager 211, as shown in FIG. 2. The interpreter 208 and imager 211 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter 208 parses the PDL file 205 according to PDL-specific language constructs, and changes these into pdl-language neutral "objects" that are presented to the imager 211 for collection. In this way, various language-specific interpreters can be mated with a single imager implementation.

To print an image, a print engine processor, sometimes referred to herein as an image processor, converts the image in a page description language or vector graphics format to a bit mapped image indicating a value to print at each pixel of the image. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,600 pixels per square inch (240×240).

Each bit representing a pixel that is "on" is converted to an electronic pulse. The electronic pulses generated from the raster pixel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pixels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Many laser printers may filter the bit map images using a look-up table to alter the pulses generated for each pixel to accomplish a certain filtering result. For instance, filters can be used to provide an economy mode where toner is reduced, to remove jagged edges, improve print quality enhancement, or to reduce the density of images. Typically, the laser printer will gather an area of data and replace either one or all the pulse values for the pixels based on the gathered area of pixel data matching a value in the look-up table. Such look-up tables modify the pixel output by altering the pulse normally used for an "on" pixel value with a pulse width modulator to shorten the pulse width to reduce the electric charge the laser beam places on the roller. Reducing the pulse width reduces the charged area for the pixel on the roller and, hence, reduces the amount of toner attracted to the roller for that pixel, thus reducing the amount of toner used to represent the pixel.

One technique to reduce toner usage is referred to as sub-pulse width modulation. In this method, the laser current applied to each pixel area on the roller is reduced in order to reduce the area of the electrical charge applied to the pixel position on the roller, thereby attracting less toner. This technique requires that the laser be continuously switched on and off within each pixel to place a sub-pixel charge in a portion of the pixel on the roller.

Another technique to reduce toner usage is to apply a single symmetrical screen pattern, e.g., a checkerboard, over the total image in order to subtract pixels from the image. Thus, the entire black area of an image is replaced with a checkerboard pattern to reduce in half the number of pixels to which toner is attracted. The problem with this approach is that, because data is removed without any consideration to the image structure, it is possible that the screen pattern would delete significant portions of the image, such as edge pixels that form the outline of the image. This reduces the edge resolution and quality of the image resulting in a "washed-out" appearance.

It is contemplated that the systems and methods described herein are applicable to color marking material as well as simple black marking material. A contone is a characteristic of a color image such that the image has all the values (0 to 100%) of gray (black/white) or color in it. A contone can be approximated by millions of gradations of black/white or color values. The granularity of computer screens (i.e., pixel size), however, can limit the ability to display absolute contones. The term halftoning refers to a process of representing a contone image by a bi-level image such that, when viewed from a suitable distance, the bi-level image gives the same impression as the contone image. For example, in printing, a contone image, such as a photograph, may be converted into a black-and-white image. Halftones of black and white shades are created through a process called dithering, in which the density and pattern of black and white pixels are varied to simulate different shades of gray. Halftoning reduces the number of quantization levels per pixel in a digital image. Over the long history of halftoning, a number of halftoning techniques have been developed which are adapted for different applications.

In conventional printing, halftones are created by processing the image through a sort of 'screen'. The frequency, measured in lines per inch, determines how many pixels are used to make each spot of gray. That is, the halftone-screen frequency determines the number of dots used to create the image. In theory, the higher the screen frequency (the more lines per inch), the more accurate the halftone will be. However, actual screen frequencies are limited by the technology because higher screen frequencies create smaller, more tightly packed dots. Traditionally, clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

As mentioned above, toner yield can be extended by reducing the halftone frequency. In addition, the methods described herein provide further toner saving while maintaining acceptable image quality for either color or mono products/printers. According to systems and methods herein, the halftone frequency is selected based on the capability of the print engine such that any banding or other kinds of artifacts are minimized. The halftone frequency is carefully selected for each of the color planes (cyan, magenta, yellow, and black (CMYK)) such that any moiré is avoided. With the selected frequency for each color plane, a halftone threshold array is generated and set at calibration of the image output device. The halftone threshold array may include different threshold values for each color as part of the calibration of the printer. The halftoning process applies the calibrated threshold array to a higher-bit (contone) input image to produce a lower-bit, halftone/rendered image.

Figure 3A:
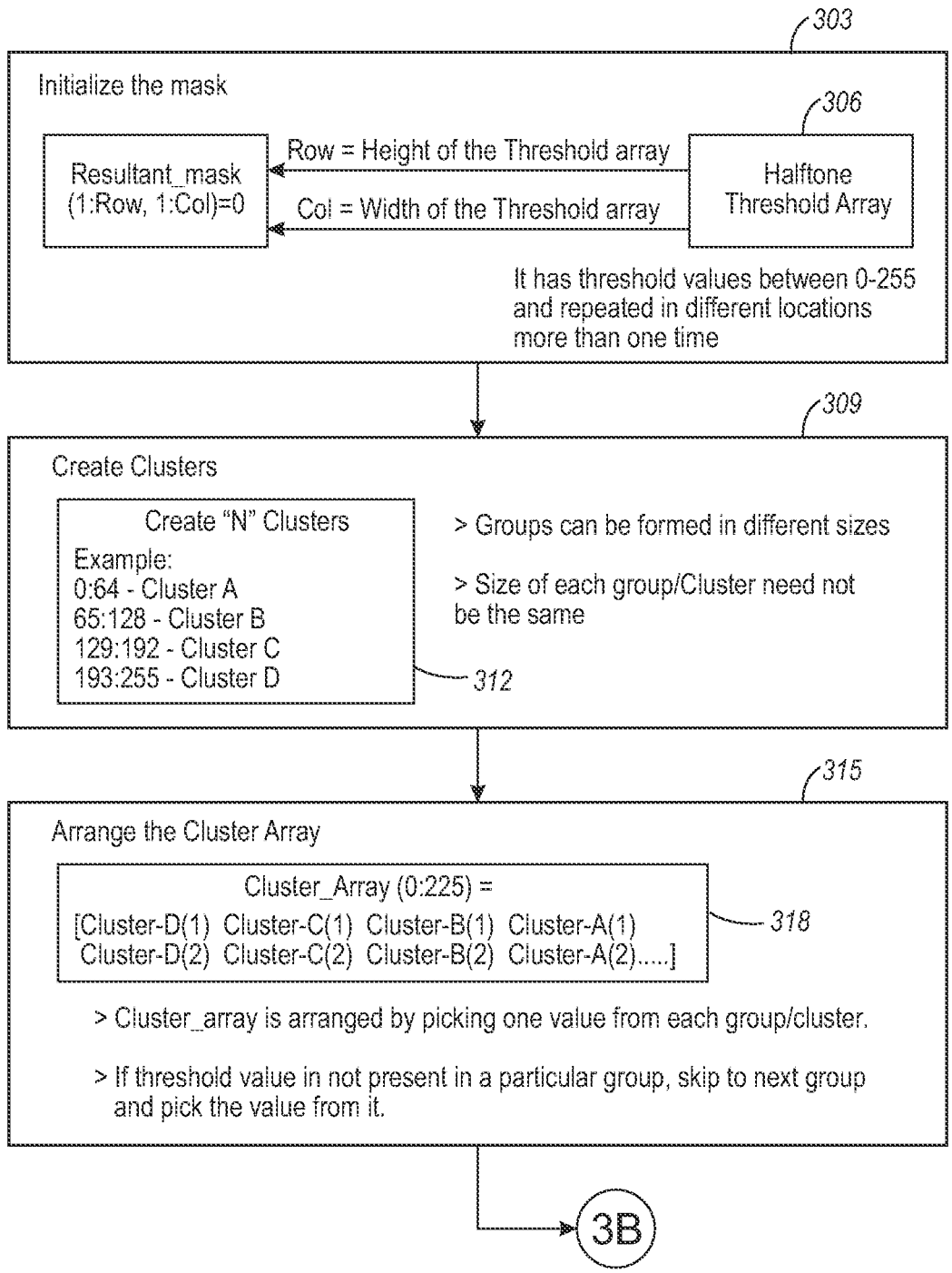
FIGS. 3A and 3B are a flow diagram illustrating systems and methods herein.
Figure 3B:
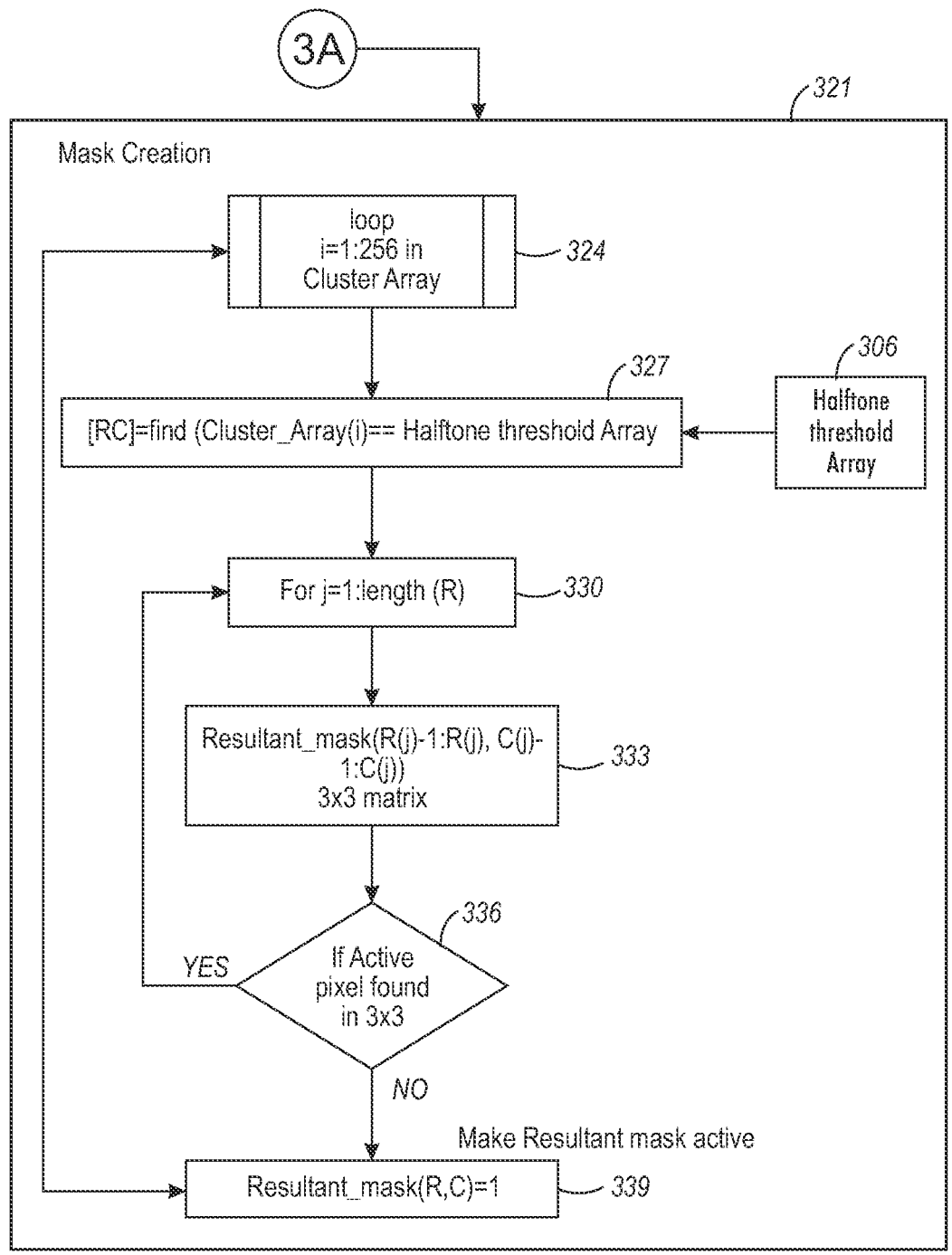

Referring to FIGS. 3A and 3B, a mask is generated based on the halftone screen for each color plane of the image in order to reduce the toner usage further, following the halftone step. That is, as shown in FIG. 3A, the first step, indicated at 303, is to initialize the mask. The initial halftone threshold array 306 includes threshold values between 0 and 255. A matrix is created from the initial halftone threshold array 306 in which the row values correspond to the height of the threshold array and the column values correspond to the width of the threshold array.

According to systems and methods herein, the halftone threshold array from the halftone screen is modified based on the mask for each individual color plane that was used to produce the lower-bit halftone/rendered image. The mask can be applied in two ways: first, the mask may be applied directly on the halftone threshold array, as described below with reference to FIG. 4; second, the mask may be applied on the rendered image, as described below with reference to FIG. 5. Note: applying the mask directly on the halftone threshold array requires no additional processing time; applying the mask on the rendered image requires little additional processing time, since it is a simple multiplication operation.

At 309, the next step in creating the mask is to create clusters from the pixel values in the halftone threshold array 306. That is, the threshold values (e.g., 0-255 for an 8-bit array) are grouped into 'N' number of clusters 312. It is not necessary to have an equal number of values in each cluster. For example, the threshold values may be grouped into four clusters, such as: Cluster-A (0-64), Cluster-B (65-128), Cluster-C (129-192), and Cluster-D (193-255). Other numbers of clusters and pixel threshold values may be used.

The next step, as shown at 315, is to arrange the clusters to form the Cluster_Array 318. For example, to arrange one pixel from each cluster, an arrangement might look like something like D-C-B-A:

[Cluster-D (1) Cluster-C (1) Cluster-B (1) Cluster-A (1) Cluster-D (2) Cluster-C (2) Cluster-B (2) Cluster-A (2) . . . ]

Temp=[193 129 65 0 194 130 66 1 195 131 67 2 . . . ]
According to systems and methods herein, the Cluster_Array 318 may be arranged by picking one value from each group/cluster. Selection of the number of clusters and arrangement of the clusters depends on the capability of the print engine 134 and the halftone screen of the device 101. For example, a different resolution printer may arrange clusters as C-A-D-B.

Referring now to FIG. 3B, the mask creation 321 is illustrated as an iterative process. If processing is performed sequentially from zero, more threshold values may be removed in lower tone level; therefore, there may not be sufficient saving in mid and high tone levels. Pixel values to remove from the threshold array 306 are identified based on the location of the pixel value in the Cluster_Array 318. Accordingly, in order to achieve adequate toner savings in all levels, pixel values are removed from different tone levels (i.e., clusters). This is achieved by cluster formation and cluster arrangement, as described herein. As mentioned above, selection of the number of clusters and arrangement of the cluster depends on the capability of the print engine 134 and the halftone screen of the device 101. For example, a print engine with higher halftone frequency capability may be able to use more clusters.

As shown in FIG. 3B, the first step is to initialize the loop function 324. At 327, the Cluster_Array 318 starts from the halftone threshold array 306. Next, at 330, mask creation is performed for each pixel along the length of the array. The Resultant_mask is created based on the pixel levels, at 333. Note: when an active pixel is placed in the mask it should not have any neighborhood pixels in the mask; otherwise, it may lead to artifacts in the printed image. If, at 336, an active pixel is found in a 3×3 portion of the array, the process reverts to the next pixel in the row. That is, an active pixel in the mask indicates the location to remove the pixel value from the halftone threshold array 306 or the rendered image. Once each pixel is evaluated according to the mask, the Resultant_mask is made active at 339.

A sample pseudo-code for mask creation 321 is shown below:

```
[r_idx c_idx]= Threshold_Array==Temp(1)
Mask[r_idx][c_idx]=1; % setting mask active.
for i=2 to length of Temp
    [r_idx c_idx]= Threshold_Array ==Temp(1)
    If eight neighborhood pixels around Mask[r_idx][c_idx]
    is not active
        Mask[r_idx][c_idx]=1; % setting mask active
    end
end
```

Note:
the last step of the pseudo-code is used to ensure that the mask does not remove two consecutive pixels. Removing any two or more consecutive pixels in any direction will lead to unnecessary artifacts and is not desired.

Figure 4:
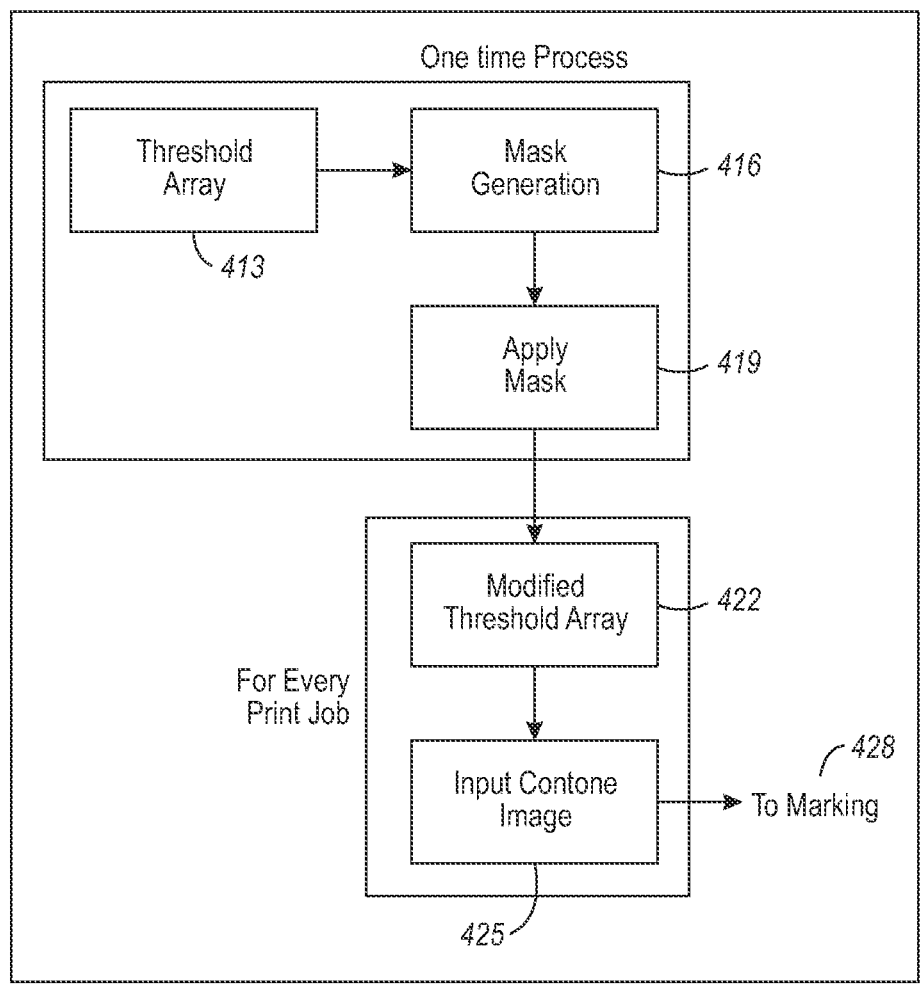
FIG. 4 is a flow diagram illustrating a method according to systems and methods herein.

Referring now to FIG. 4, the mask can be applied on the halftone threshold array. The resultant array can be used as a modified halftone threshold array, which may be sent to a marking device. In particular, as would be known to one of ordinary skill in the art, the halftoning process applies the calibrated halftone threshold array to the higher-bit (contone) input image to produce a lower-bit, halftone image, as shown at 413. As described above, the halftone frequency is selected for all color planes, based on the capability of the print engine. This is a one-time process, based on the particular machine in which the halftone threshold array is created from the different halftone frequencies for each color plane during calibration. The mask is generated, as indicated at 416. Again, as the mask generation 416 is based on the threshold array, this is a one-time process. Then, at 419, the mask is applied to the threshold array 413, which produces a modified threshold array 422. The modified threshold array 422 is used to render an image from the input contone image, as indicated at 425. The rendered image may then be sent for marking by the marking device, as shown at 428. In other words, with the selected frequency for each color plane, a modified threshold array 422 is generated and applied to the input plane to produce a halftone/rendered image with a mask applied.

Below are tables showing pixel counts for testing results on several sample pages with approximately low area coverage (20%) and high area coverage. In order to determine the savings in toner, the starting pixel count values were determined from a rendered image (bitmap) using an initial halftoning process, as is known in the art. Table 1 shows the starting pixel counts for five different test pages using a printer without using the toner savings described herein.

TABLE 1

Pixel counts from a sample printer with no toner savings

| | Original | | | |
|---|---|---|---|---|
| | Cyan | Magenta | Yellow | Black |
| Testpage 1 | 0 | 23230 | 20509 | 1321168 |
| Testpage 2 | 1775736 | 1261527 | 1316406 | 1026629 |
| Testpage 3 | 761674 | 993446 | 1357979 | 2505746 |
| Testpage 4 | 1712931 | 2192970 | 2373544 | 357360 |
| Testpage 5 | 2556048 | 2185226 | 2580895 | 1174241 |

Table 2 shows the pixel counts from the same printer after a mask is applied, i.e., this is the result from the modified threshold array.

TABLE 2

Pixel counts from modified threshold array

Saving Method

| | Cyan | Magenta | Yellow | Black |
|---|---|---|---|---|
| Testpage 1 | 0 | 19066 | 16306 | 1056962 |
| Testpage 2 | 1234215 | 1033695 | 1077786 | 821668 |
| Testpage 3 | 565452 | 839579 | 992400 | 2003131 |
| Testpage 4 | 1234791 | 1768796 | 1853621 | 286029 |
| Testpage 5 | 1860329 | 1758736 | 1910175 | 936063 |

Table 3 shows the percentage reduction between the test page with no toner savings (Table 1) and application of the modified threshold array (Table 2). As shown in Table 3, this method averages approximately 20% reduction in toner consumption.

TABLE 3

Percentage reduction in pixel counts

Pixel Reduction in %

| | Cyan % | Magenta % | Yellow % | Black % |
|---|---|---|---|---|
| Testpage 1 | 0 | 17.93 | 20.49 | 20.00 |
| Testpage 2 | 30.50 | 18.06 | 18.13 | 19.96 |
| Testpage 3 | 25.76 | 15.49 | 26.92 | 20.06 |
| Testpage 4 | 27.91 | 19.34 | 21.90 | 19.96 |
| Testpage 5 | 27.22 | 19.52 | 25.99 | 20.28 |

As illustrated above, the method optimizes toner usage while maintaining image quality. That is, visually the method does not exhibit any significant loss in image quality while still maintaining the overall dynamic color range.

Figure 5:
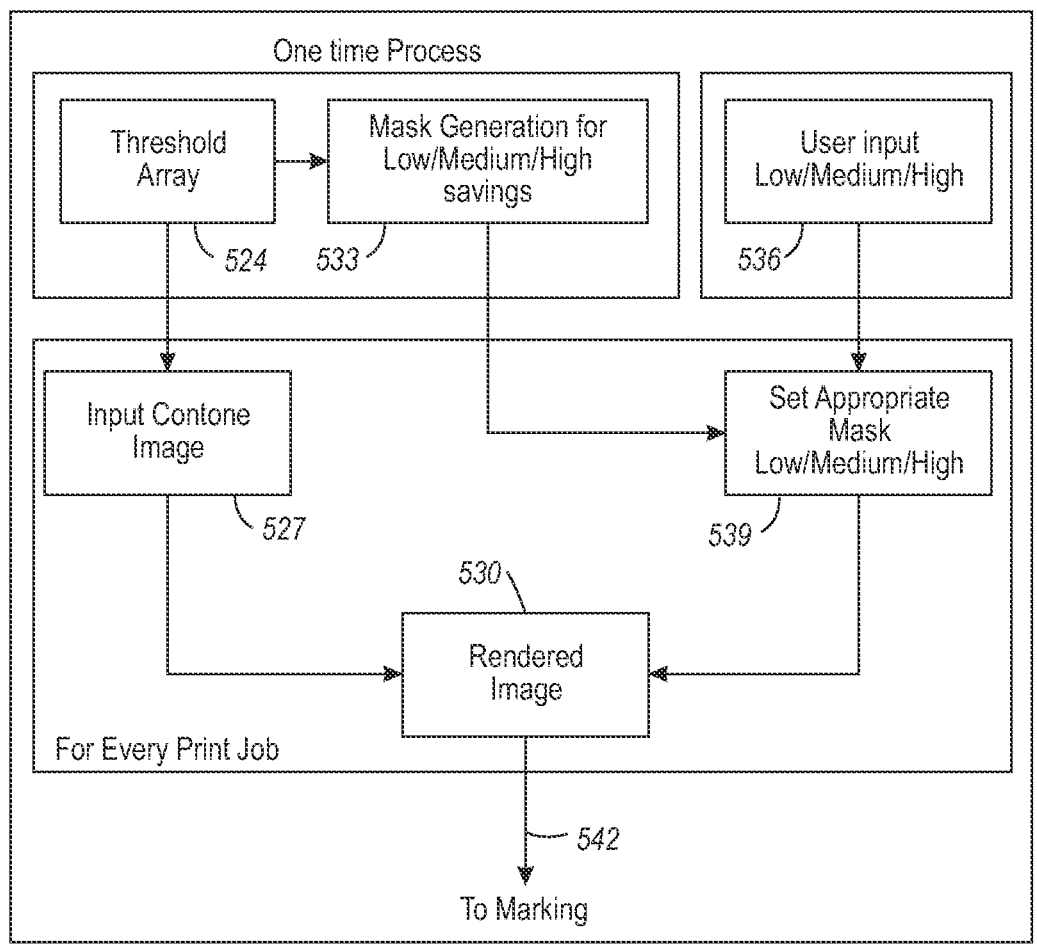
FIG. 5 is a flow diagram illustrating a method according to systems and methods herein.

Referring now to FIG. 5, the mask can be used to remove pixels from a rendered image. In this case, the mask can be applied in post processing, if applicable. In particular, as would be known to one of ordinary skill in the art, the halftoning process applies the calibrated halftone threshold array to the higher-bit (contone) input image to produce a lower-bit, halftone image, as shown at 524. As described above, halftone frequencies are selected for all color planes, based on the capability of the print engine. This is a one-time process, based on the particular machine in which the halftone threshold array is created from the different halftone frequencies for each color plane during calibration. The threshold array 524 is applied to the input contone image, as indicated at 527. Such a process produces a rendered image, as indicated at 530. Meanwhile, the mask is generated, as indicated at 533. Again, as the mask generation 533 is based on the threshold array, this is a one-time process. The mask generation 533 can be scaled so that the image output device can provide the option of choosing the relative level of toner saving (e.g., low, medium, or high toner savings). As shown at 536, a user can select the relative level of toner saving. Then, at 539, the appropriate mask is selected and applied to the rendered image 530. The rendered image 530 may then be sent for marking by the marking device, as shown at 542. In other words, with the selected frequency for each plane, a threshold array 524 is generated and applied to the input plane to produce a halftone/rendered image 530. The mask is then applied to remove pixels from the rendered image. As described above, during formation of the mask, the clustering is controlled to avoid removing two consecutive pixels from the array (to allow virtually unnoticeable toner reduction).

Note: in the methods described herein, the mask is derived from the halftone threshold array, which provides more control on the toner savings as well as quality of the image. According to systems and methods herein, toner usage is optimized while maintaining image quality. Such control is not possible to this extent in other methods. As described above, the level of toner savings can be controlled by modifying the number of clusters and in the arrangement of the array. This enables the option to provide for the user to select the level of toner savings (e.g., low toner saving, medium toner saving, and high toner saving).

After a given page in the job has been processed as described above, each subsequent page of the job to be processed is treated in the same way. Note that it is not necessary for the "imager" used in the processor to actually produce an image. Print-ready images may be created later when the job is processed for printing.

Additionally, as noted above, for color printers, each color toner may be used at a different rate. It is contemplated that most printing is performed with specific colors repeatedly. Accordingly, one or more of the colors (Cyan/Magenta/Yellow/Black) may be over utilized such that the toner cartridge for the printer may run out of toner for those particular color(s). When the toner level reaches a critical point, the user is unable to print any document until the empty toner is replaced. In order to afford the user time to place a purchase order for toner between the low-level warning and the error message that may stop the printer, the life of the toner cartridge may be extended for a short period between those times by applying the mask to only specific color planes in the threshold array having the low toner condition. For example, according to devices and methods herein, a switch may be provided on the printer in order to switch between 'high-quality' and 'high-throughput' printing modes based on the toner level. Alternatively or in addition, the print quality mode for the image output device may be automatically set to an economical 'toner saver' mode as a default. A switch may be enabled on the printer on a color-by-color basis so that the toner saver is applied only to the color having a low level of toner.

To utilize the toner cartridges in an effective manner, the system may automatically detect toner cartridge level when it falls below a specific threshold level (for example: Cyan toner cartridge level drops below 25%). Then the printer will swap the default halftone of that particular color with a respective modified halftone threshold based on the appropriate mask applied to the halftone threshold array. Alternatively, the printer can activate the toner saver process in post processing in which the mask is applied to remove only the particular color pixels from the rendered image. Succeeding prints, after the warning, will use less toner for the specific color or colors having toner level below the selected threshold. This provides the user with extra time to replace the low toner cartridge while still continuing to provide print capability.

Figure 6:
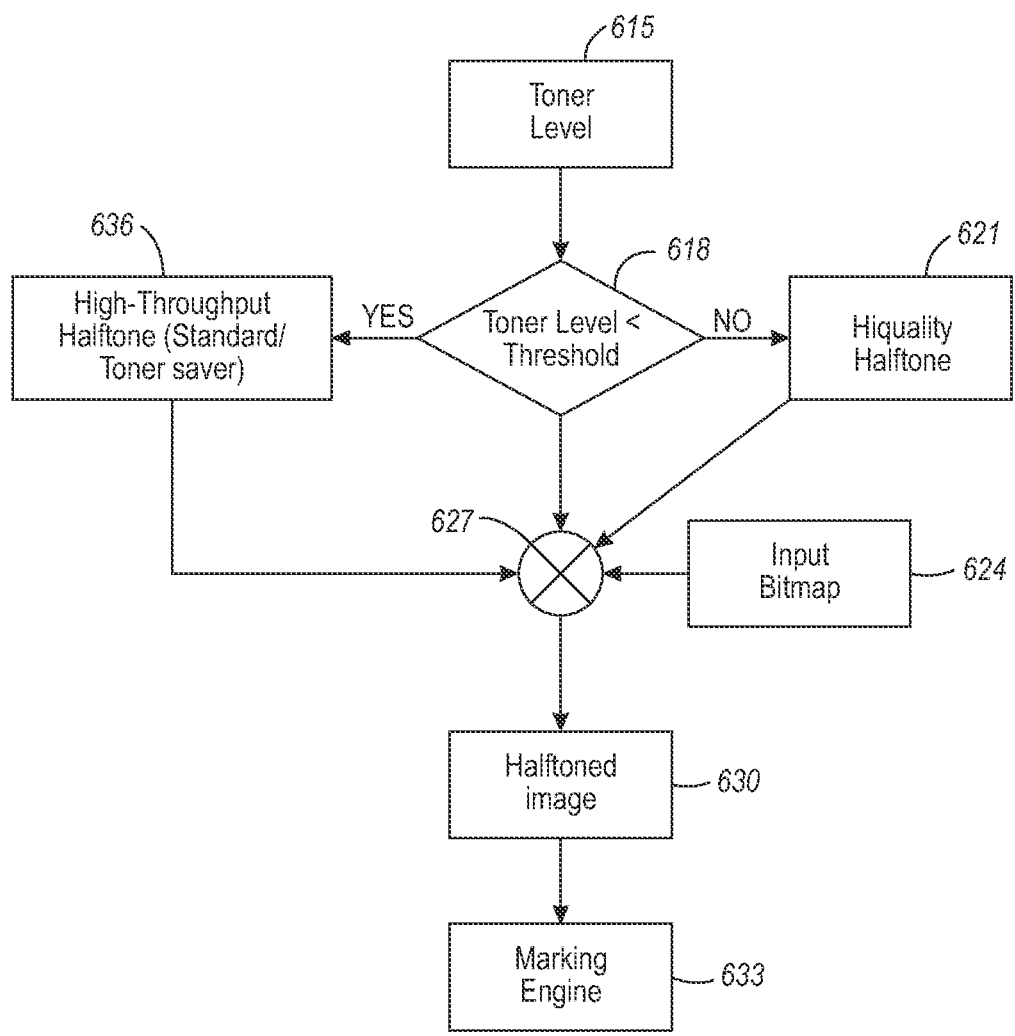
FIG. 6 is a flow diagram illustrating additional method steps according to systems and methods herein.

Referring to FIG. 6, the toner level is determined for each of the colors for the machine, at 615. A sensor or other known device may be used to determine the amount of toner for each color available for printing and provide an indication of toner level. Typically, the colors are cyan, magenta, yellow, and black (CMYK). A separate sensor can be used for each color. At 618, a processor in the printing device determines if the toner level for any color is below a predetermined threshold. If, at 618, none of the toner cartridges is below the predetermined threshold, the process continues with 'high-quality' halftone processing 621. The 'high-quality' halftone processing 621 may include applying the calibrated halftone threshold array to the input bitmap 624, as indicated at 627. This produces a halftoned image 630, which may then be sent for marking by the marking device, as shown at 633. If, at 618, any one of the toner cartridges is below the predetermined threshold level, the process continues with 'high-throughput' halftone processing 636. The 'high-throughput' halftone processing 636 may include applying a mask to the calibrated halftone threshold array for only the toner color having low level cartridge in order to produce a modified threshold array for the selected color, as described above with reference to FIG. 4. The modified threshold array is then applied to the input bitmap 624, as indicated at 627. This produces a halftoned image 630, which may then be sent for marking by the marking device, as shown at 633.

One of the unique aspects of this solution is that, in the 'high-throughput' halftone processing, toner saving is used only on those colors that are under the threshold established on the printer. This process may be selectively applied so that it will not affect the other colors that do not have a low toner warning. Therefore, when a print job does not have any pixels being requested with the low toner color, there will be no difference in the output. Additionally, the threshold level may be established on the printer such that a user will not be able to change this threshold level. However, it is contemplated that this method can be scaled up or down so that the printer can provide the option of selecting the relative level of toner saving.

Furthermore, since the switch from the default print quality mode to the 'toner saver' print quality mode is done at the processing level and not as a job level setting, it is expected that there will be no performance degradation. Upon replacing the toner, the 'high-throughput' (Toner Saver) halftones are replaced with the default halftones on all subsequent jobs.

Figure 7:
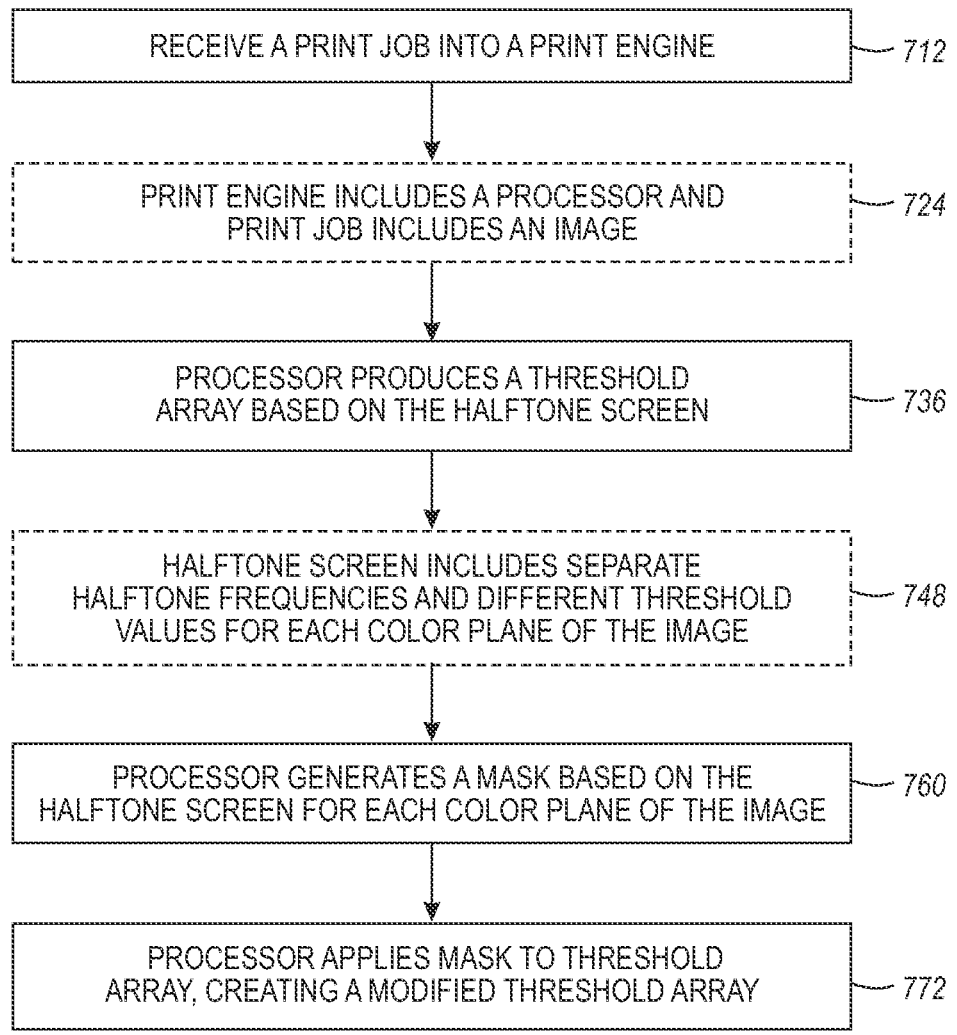
FIG. 7 is a flow diagram illustrating methods herein.

FIG. 7 is a flow diagram illustrating the processing flow of an exemplary method according to systems and methods herein. At 712, a print job is received into a print engine. As indicated at 724, the print engine includes a processor, and the print job includes an image. At 736, a threshold array of pixel values is produced by the processor for each color plane of the image based on a halftone screen. As indicated at 748, the halftone screen includes separate halftone frequencies and different threshold values for each color plane of the image. The halftone frequencies and the threshold values are set during calibration of the print engine. At 760, the processor generates a mask based on the halftone screen for each color plane of the image. The mask is generated by grouping the pixel values from the threshold array into a selected number of clusters, arranging the clusters into a cluster array using one pixel value from each cluster, and identifying pixel values to remove from the threshold array based on the location of the pixel value in the cluster array. The mask is controlled to avoid removing two consecutive pixels from the image based on the threshold array. At 772, the processor applies the mask to the threshold array, creating a modified threshold array. The modified threshold array corresponds to relatively reduced toner usage for rendering the image.

Figure 8:
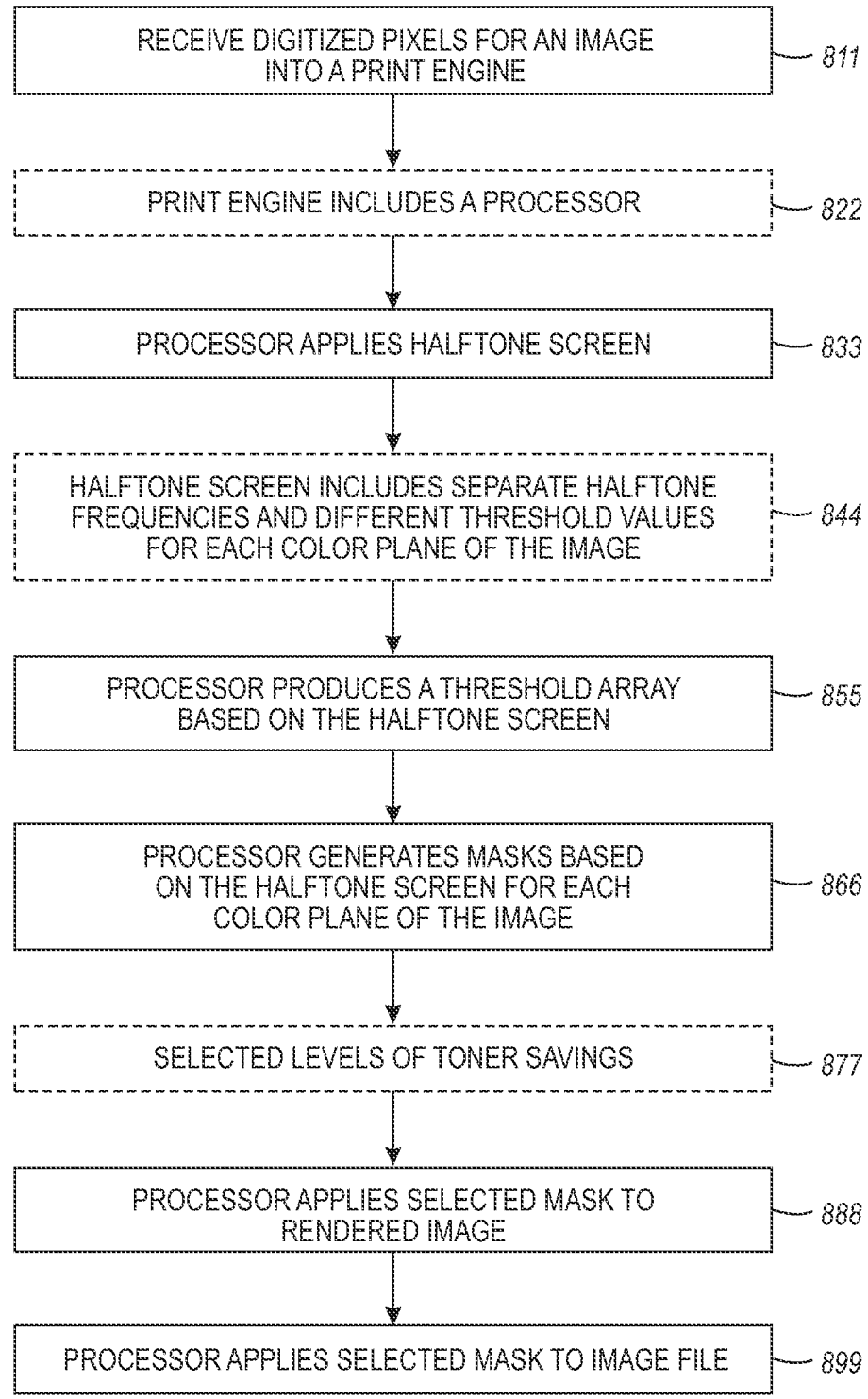
FIG. 8 is a flow diagram illustrating methods herein.

FIG. 8 is a flow diagram illustrating the processing flow of an exemplary method according to systems and methods herein. At 811, digitized pixels for an image comprising color planes of different colors are received into a print engine. As indicated at 822, the print engine includes a processor. At 833, a halftone screen is applied, by the processor, to the pixels of continuous image data. As indicated at 844, the halftone screen includes separate halftone frequencies and different threshold values for each color plane of the image. The halftone frequencies and threshold values are set during calibration of the print engine. The halftone frequencies are based on reducing banding and image artifacts in a rendered image. As indicated at 855, a threshold array of pixel values is produced by applying the halftone screen. At 866, the processor generates masks based on the halftone screen for each color plane of the image, at 877. The masks are generated by grouping the pixel values from the threshold array into a selected number of clusters, arranging the clusters into a cluster array using one pixel value from each cluster, and identifying pixel values to remove from the threshold array based on location of the pixel value in the cluster array. Multiple masks can be created for selected levels of toner savings (e.g., low toner saving, medium toner saving, and high toner saving), as indicated at 877. The mask is controlled to avoid removing two consecutive pixels from the image based on the threshold array. At 888, the threshold array of pixel values is translated to an image file. At 899, the processor applies the mask to the image file to remove pixels from the rendered image.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RGB-to-YCbCr converter to obtain luminance (Y) and chrominance (Cb,Cr) values. It should be appreciated that pixels may be represented by values other than RGB or YCbCr.

As shown in FIG. 9, exemplary printers, copiers, multi-function machines, and multi-function devices (MFD) 101 may be located at various different physical locations 906. Other devices according to systems and methods herein may include various computerized devices 908. The computerized devices 908 can include print servers, printing devices, personal computers, etc., and are in communication (operatively connected to one another) by way of a network 902. The network 902 may be any type of network, including a local area network (LAN), a wide area network (WAN), or a global computer network, such as the Internet.

The hardware described herein plays a significant part in permitting the foregoing method to be performed, rather than function solely as a mechanism for permitting a solution to be achieved more quickly, (i.e., through the utilization of a computer for performing calculations). For example, these methods reduce the usage of toner when customers are willing to trade slight quality deprecation for cost efficiency. Therefore, such processes as creating a mask and applying the mask to an image require the use of a computerized image processor to both access the image and to process the image.

As would be understood by one ordinarily skilled in the art, the processes described herein cannot be performed by human alone (or one operating with a pen and a pad of paper) and instead, such processes can only be performed by a machine. Specifically, processes such as printing, scanning, electronically altering images using an image processor etc., require the utilization of different specialized machines. Therefore, for example, the production of a threshold array of pixel values based on a halftone screen, creation of a mask based on the halftone screen for each color plane of an image, and printing/scanning, which are performed by the devices herein, cannot be performed manually (because machines are required to perform digital image processing and printing) and such devices are integral with the processes performed by methods herein. Further, such machine-only processes are not mere "post-solution activity" because the automated analysis of each image color plane by an image processor is integral with the steps of the processes described herein. Similarly, the receipt of a print job and conversion of data utilize special purpose equipment (telecommunications equipment, routers, switches, etc.) that is distinct from a general-purpose processor. In other words, these various machines are integral with the methods herein because the methods cannot be performed without the machines (and cannot be performed by humans alone).

Additionally, the methods herein solve many highly complex technological problems. For example, the toner yield on an electro-photographic printer can be maximized by reducing the usage of toner without increasing processing time. Methods herein solve this technological problem by combining halftone reduction with a mask applied to the halftone threshold array. This is especially useful in solving this technological problem because it provides reduced toner usage with dramatically reduced quality degradation as compared to other toner-reduction techniques. By providing such benefits, the methods herein reduce the amount and complexity of hardware and software needed to be purchased, installed, and maintained by those attempting to reduce the usage of toner with only slight quality deprecation for cost efficiency, thereby solving a substantial technological problem that is experienced today.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further device and method herein, an article of manufacture is provided that includes a tangible computer readable medium having computer readable instructions embodied therein for performing the steps of the computer implemented methods, including, but not limited to, the methods illustrated in FIGS. 7 and 8. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 7 and 8.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM, a hard disk contained in the storage section of the disk units, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are not described in detail herein to keep this disclosure focused on the salient features presented. The systems and methods herein can encompass devices that print in color, monochrome, or handle color or monochrome image data. All foregoing systems and methods are specifically applicable to electrostatographic and/or xerographic machines and/or processes.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method, comprising:
receiving a print job into a print engine comprising a processor, said processor being specialized for processing image data, said print job comprising an image;
producing, with said processor, an array of pixel values for each color plane of said image by applying a halftone screen associated with said print engine, said halftone screen including separate halftone frequencies and different threshold values for each color plane of said image, said halftone frequencies and said threshold values having been established during calibration of said print engine, said array of pixel values comprising a threshold array;
generating, with said processor, a mask for each said color plane of said image to be applied to said halftone screen, said generating said mask comprising:
grouping said pixel values for said threshold array into a selected number of clusters,
arranging said clusters into a cluster array using one pixel value from each cluster, and
identifying pixel values to remove from said threshold array, said identifying said pixel values comprising locating each said pixel value in said cluster array and selecting a pixel value from each cluster to be removed, said mask being controlled to avoid removing two consecutive pixels from said image; and
applying, using said processor, said mask to said threshold array, creating a modified threshold array, said modified threshold array corresponding to reduced toner usage for a rendered image.

2. The method according to claim 1, further comprising:
applying said modified threshold array to said image of said print job, using said processor, producing a modified rendered image; and
sending said modified rendered image to an image output device associated with said print engine.

3. The method according to claim 1, further comprising:
scaling said generating said mask for selected levels of toner saving.

4. The method according to claim 1, said receiving said print job further comprising:
receiving a PDL file;
parsing said PDL file;
identifying objects from said PDL file; and
identifying individual color planes for said objects.

5. The method according to claim 1, further comprising:
receiving, in said processor, indication of toner level for a color of said color plane being below a predetermined threshold level; and
applying, using said processor, said mask to said threshold array for only said color of said color plane below predetermined threshold level.

6. A method comprising:
receiving digitized pixels for an image comprising color planes of different colors into a print engine comprising a processor, said processor being specialized for processing image data, said digitized pixels comprising continuous image data;
applying, using said processor, a halftone screen to said digitized pixels of said continuous image data, said halftone screen including separate halftone frequencies and different threshold values for each color plane of said image, said halftone frequencies and said threshold values having been set during calibration of said print engine, and said halftone frequencies being selected to reduce banding and image artifacts in a rendered image, said applying said halftone screen to said digitized pixels producing an array of pixel values, said array of pixel values comprising a threshold array;
generating, by said processor, a mask to be applied to said halftone screen for each of said color planes of said image, said generating said mask comprising:
grouping said pixel values for said threshold array into a selected number of clusters,
arranging said clusters into a cluster array using one pixel value from each cluster, and
identifying pixel values to remove from said threshold array, said identifying said pixel values comprising locating each said pixel value in said cluster array and selecting a pixel value from each cluster to be removed, said mask being controlled to avoid removing two consecutive pixels from said image; and
translating, by said processor, said threshold array of pixel values to an image file; and
applying, by said processor, said mask to said image file, removing selected pixels from said rendered image based on said mask.

7. The method according to claim 6, said generating said mask comprising:
scaling said mask for selected levels of toner saving.

8. The method according to claim 6, further comprising:
applying, using said processor, said threshold array to an input image, generating said rendered image; and
applying, using said processor, said mask to said rendered image.

9. The method according to claim 6, further comprising:
receiving, in said processor, indication of toner level for a color of said color planes being below a predetermined threshold level; and
applying, using said processor, said mask to said threshold array for only said color of said color planes below said predetermined threshold level.

10. A multifunction device comprising:
a control system comprising a processor, said processor comprising a digital image processor;
a user interface connected to said control system; and
an image output device connected to said processor,
said user interface providing user selection of a level of toner savings for said image output device,
said processor receiving digitized pixels for an image comprising color planes of different colors, said digitized pixels comprising continuous image data,
said digital image processor applying a halftone screen to said digitized pixels of said continuous image data, said halftone screen including separate halftone frequencies and different threshold values for each color plane of said image, said halftone frequencies and said threshold values having been set during calibration of a print engine associated with said image output device, and said halftone frequencies being selected to reduce banding and image artifacts in a rendered image according to said image output device,
said digital image processor producing an array of pixel values using said halftone screen, said array of pixel values comprising a threshold array,
said processor generating a mask to be applied to said halftone screen for each of said color planes of said image, said generating said mask comprising:
grouping said pixel values for said threshold array into a selected number of clusters, arranging said clusters into a cluster array using one pixel value from each cluster, and identifying pixel values to remove from said threshold array, said identifying said pixel values comprising locating each said pixel value in said cluster array and selecting a pixel value from each cluster to be removed, said mask being controlled to avoid removing two consecutive pixels from said image, said processor translating said pixel values of said threshold array to an image file, said processor applying said mask to said image file, removing selected pixels from said rendered image, and said processor sending said image file to said image output device.

11. The multifunction device according to claim 10, further comprising:

said processor receiving a print job further comprising said processor receiving a PDL file, said processor parsing said PDL file, said processor identifying objects from said PDL file, and said processor identifying individual color planes for said objects supported by said image output device.

12. The multifunction device according to claim 10, further comprising:

applying, using said processor, said threshold array to an input image, generating said rendered image; and applying, using said processor, said mask to said rendered image.

13. The multifunction device according to claim 10, further comprising:

sensors determining toner level for each color of said image output device, said control system including a predetermined threshold level for each color toner;

said processor receiving indication of toner level for a color of said color plane being below said predetermined threshold level, and said processor applying said mask to said threshold array for only said color of said color plane below said predetermined threshold level.

14. A method comprising:

receiving digitized pixels for an image comprising color planes of different colors into a print engine comprising a processor, said processor being specialized for processing image data, said digitized pixels comprising continuous image data;

applying, using said processor, a halftone screen to said digitized pixels of said continuous image data, said halftone screen including separate halftone frequencies and different threshold values for each color plane of said image, said halftone frequencies and said threshold values having been set during calibration of said print engine;

producing, by said processor, an array of pixel values by applying said halftone screen, said array of pixel values comprising a threshold array;

generating, by said processor, a mask to be applied to said halftone screen for each of said color planes of said image, said generating said mask comprising:

grouping said pixel values for said threshold array into a selected number of clusters, arranging said clusters into a cluster array using one pixel from each cluster, and identifying pixel values to remove from said threshold array, said identifying said pixel values comprising locating each said pixel value in said cluster array and selecting a pixel value from each cluster to be removed, said mask being controlled to avoid removing two consecutive pixels from said image; and applying, by said processor, said mask to said threshold array, creating a modified threshold array, said modified threshold array corresponding to reduced toner usage for rendering said image.

15. The method according to claim 14, further comprising:

applying, using said processor, said threshold array to an input image, generating a rendered image; and applying, using said processor, said mask to said rendered image.

16. The method according to claim 15, further comprising:

translating, using said processor, said pixel values of said threshold array to an image file, applying, using said processor, said mask to said image file, removing selected pixels from said rendered image, and sending, using said processor, said image file to an image output device associated with said print engine.

17. The method according to claim 14, further comprising:

receiving, using said processor, a selected level of toner saving; and scaling, using said processor, said generating said mask for said selected level of toner saving.

18. The method according to claim 14, said receiving a print job further comprising:

receiving a PDL file;

parsing said PDL file;

identifying objects from said PDL file; and identifying individual color planes for said objects.

19. The method according to claim 14, further comprising:

receiving, in said processor, indication of toner level for a color of said color plane being below a predetermined threshold level; and applying, using said processor, said mask to said threshold array for only said color of said color plane below said predetermined threshold level.

\* \* \* \* \*